(12) United States Patent
Ujihara et al.

(10) Patent No.: US 9,690,010 B2
(45) Date of Patent: Jun. 27, 2017

(54) RESIN COMPOSITION FOR OPTICAL MATERIAL, OPTICAL FILM, AND LIQUID CRYSTAL DISPLAY DEVICE

(71) Applicant: DIC Corporation, Tokyo (JP)

(72) Inventors: Teppei Ujihara, Ichihara (JP); Yusuke Tajiri, Ichihara (JP); Masato Ishiyama, Ichihara (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/022,094

(22) PCT Filed: Sep. 25, 2014

(86) PCT No.: PCT/JP2014/075482
§ 371 (c)(1),
(2) Date: Mar. 15, 2016

(87) PCT Pub. No.: WO2015/046360
PCT Pub. Date: Apr. 2, 2015

(65) Prior Publication Data
US 2016/0223714 A1    Aug. 4, 2016

(30) Foreign Application Priority Data

Sep. 30, 2013  (JP) ................................. 2013-203983

(51) Int. Cl.
| | |
|---|---|
| *C08G 63/02* | (2006.01) |
| *G02B 1/04* | (2006.01) |
| *C08L 67/02* | (2006.01) |
| *C08L 69/00* | (2006.01) |
| *G02B 1/14* | (2015.01) |
| *G02F 1/1335* | (2006.01) |
| *C08G 64/00* | (2006.01) |

(52) U.S. Cl.
CPC ................ *G02B 1/04* (2013.01); *C08L 67/02* (2013.01); *C08L 69/00* (2013.01); *G02B 1/14* (2015.01); *G02F 1/133528* (2013.01)

(58) Field of Classification Search
CPC ................................. G03C 1/005; C08G 63/00
USPC .................. 430/631; 528/176, 188; 524/174
See application file for complete search history.

(56) References Cited

U.S. PATENT DOCUMENTS 6,210,872 B1 *   4/2001   Hosaki ................ C08G 63/605
                                                       430/20

FOREIGN PATENT DOCUMENTS

JP            2011-236336 A      11/2011

OTHER PUBLICATIONS

International Search Report dated Dec. 9, 2014, issued for PCT/JP2014/075482.

* cited by examiner

*Primary Examiner* — Terressa Boykin
(74) *Attorney, Agent, or Firm* — Locke Lord LLP

(57) ABSTRACT

For providing a resin composition for an optical material which exhibits less change in birefringence due to external force and which is suitable for use in the production of an optical member; an optical film obtained by using the resin composition; and a liquid crystal display device using the same, provided is a resin composition containing a polycarbonate resin (X); and a polyester resin (Y) whose number average molecular weight is 200 to 2,000 and which is represented by General Formula (1): B-(G-A)$_n$-G-B (wherein B represents an aryl monocarboxylic acid residue having 6 to 12 carbon atoms or an aliphatic monocarboxylic acid residue having 1 to 8 carbon atoms.

20 Claims, No Drawings

RESIN COMPOSITION FOR OPTICAL MATERIAL, OPTICAL FILM, AND LIQUID CRYSTAL DISPLAY DEVICE

TECHNICAL FIELD

The present invention relates to a resin composition which is inexpensive, easy to handle, and suitable for use in production of an optical member which exhibits little change in birefringence due to external force; an optical film obtained by using the resin composition; and a liquid crystal display device using the same.

BACKGROUND ART

In recent years, as the display market expands, a demand for requiring a clearer image is increased and, instead of a simple transparent material, an optical material having more advanced optical properties imparted thereto has been demanded.

In general, since the refractive index of a polymer is different in a molecular main chain direction and a direction perpendicular to the main chain direction, birefringence occurs. Depending on the purpose, it is required to precisely control the birefringence, and in the case of a protective film used for a polarizing plate of liquid crystals, a polymer material molded body in which the birefringence is smaller while the total light transmittance is the same is needed, and triacetylcellulose is used as a representative material.

In this situation, recently, as the size of a liquid crystal display is increased and the size of a polymer optical material molded article necessary for the liquid crystal display is increased, a material which exhibits little change in birefringence due to external force has been demanded in order to reduce a distribution of birefringence caused by deviation of the external force.

A material, in which a molded article which exhibits little change in birefringence due to external force is obtained, is a polymer optical material in which a molded article having a low photoelastic coefficient is obtained. Among these materials, a polycarbonate resin has been attracting attention as a material for an optical film used for the purpose of protecting a polarizing plate, since the polycarbonate resin excels in transparency and heat resistance and has excellent mechanical properties such as shock resistance. However, the polycarbonate resin has a disadvantage in that a phase difference (photoelastic coefficient) greatly varies with respect to a distortion when an external force is added, and thus the phase difference greatly varies even by a small distortion, thereby easily generating optical unevenness. As the polycarbonate resin which has a low photoelastic coefficient and can obtain a cured product suitable for use in the optical material, for example, disclosed is polycarbonate to which a fluorene skeleton is introduced (for example, refer to PTL 1). However, as described above, it is necessary to introduce a special skeleton, for example, a fluorene skeleton, for the polycarbonate resin disclosed in PTL 1, and thus there is a problem in that the cost is increased. Also, the Tg of the resin is 200° C. or higher, which is extremely high, compared to a general bisphenol-based polycarbonate resin whose Tg is about 140° C. Therefore, it is difficult to apply a melt extrusion method, which is a general film forming method of a polycarbonate resin film, and there is also a problem in handling properties.

CITATION LIST

Patent Literature

[PTL 1] JP-A-2011-236336

SUMMARY OF INVENTION

Technical Problem

A problem to be solved by the present invention is to provide a resin composition which is inexpensive, easy to handle, and suitable for use in production of an optical member which exhibits little change in birefringence due to external force; an optical film obtained by using the resin composition; and a liquid crystal display device using the same.

Solution to Problem

As a result of a thorough study, the present inventors found that by using an ester compound essentially including an aliphatic structure, whose terminals are sealed and a molecular weight is in a particular range, as an additive, an optical member obtained by using a general resin such as the bisphenol-based polycarbonate resin, as a raw material exhibits little change in birefringence due to external force; a resin composition containing the additive and the polycarbonate resin is particularly preferable when manufacturing an optical film; and the optical film is preferably used as a member when manufacturing a liquid crystal display device, thereby completing the present invention.

That is, the present invention provides a resin composition for an optical material including: a polycarbonate resin (X); and a polyester resin (Y) whose number average molecular weight is from 200 to 2,000 and which is represented by General Formula (1) shown below.

$$B\text{-}(G\text{-}A)_n\text{-}G\text{-}B \qquad (1)$$

In the formula, B represents an aryl monocarboxylic acid residue having 6 to 12 carbon atoms or an aliphatic monocarboxylic acid residue having 1 to 8 carbon atoms. G represents an alkylene glycol residue having 2 to 12 carbon atoms or an oxyalkylene glycol residue having 4 to 12 carbon atoms. A represents an alkylene dicarboxylic acid residue having 2 to 12 carbon atoms or an aryl dicarboxylic acid residue having 6 to 12 carbon atoms. n is an integer of 0 to 9.

In addition, the present invention provides an optical film including the resin composition for an optical material.

Furthermore, the present invention provides a liquid crystal display device including the optical film.

Advantageous Effects of Invention

According to the present invention, it is possible to provide a resin composition which exhibits less change in birefringence due to external force and which is suitable for use in production of an optical member by using a polycarbonate resin, which is a general commodity. It is possible to easily obtain an optical film which exhibits little change in birefringence due to external force by using the resin composition. Also, it is possible to obtain a liquid crystal display device whose image visibility hardly changes due to external force by using the optical film. In addition, it is possible to obtain an optical film having excellent moisture permeability resistance by using the resin composition of the present invention.

DESCRIPTION OF EMBODIMENTS

Examples of the polycarbonate resin (X) used in the present invention include polycarbonate having a variety of structural units. Preferably, an aromatic polycarbonate resin having an aromatic structure can be exemplified. As the aromatic polycarbonate resin, it is possible to use resins which are manufactured by, for example, an interfacial polycondensation method of divalent phenol and halogenated carbonyl or a melt polymerization method (ester interchange method) of divalent phenol and carbonic acid diester.

In addition, as the polycarbonate (X), polycarbonate can be used alone, but also a polymer alloy of polycarbonate and an acrylonitrile-styrene copolymer (AS resin), a polymer alloy of polycarbonate and an acrylonitrile-butadiene-styrene copolymer (ABS resin), a polymer alloy of polycarbonate and a styrene-butadiene rubber, a polymer alloy of polycarbonate and a polymethyl methacrylate resin, a polymer alloy of polycarbonate and a polyethylene terephthalate (PET resin), and a polymer alloy of polycarbonate and polybutylene terephthalate (PBT resin) can be used.

Examples of the divalent phenol which is a raw material of the polycarbonate (X) include 4,4'-dihydroxybiphenyl, bis(4-hydroxyphenyl)methane, 1,1-bis(4-hydroxyphenyl)ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 1,1-bis(4-hydroxyphenyl)cyclohexane, bis(4-hydroxyphenyl)ether, bis(4-hydroxyphenyl)sulfide, bis(4-hydroxyphenyl)sulfone, bis(4-hydroxyphenyl)sulfoxide, bis(4-hydroxyphenyl)ketone, hydroquinone, resorcin, and catechol. Among these divalent phenols, bis(hydroxyphenyl)alkanes are preferable and further substances including 2,2-bis(4-hydroxyphenyl)propane as a major raw material are particularly preferable.

In addition, examples of a carbonate precursor include carbonyl halide, carbonyl ester, and haloformate. Specific examples thereof include phosgene; diaryl carbonate such as dihaloformate of divalent phenol, diphenyl carbonate, ditolyl carbonate, bis(chlorophenyl)carbonate, and m-cresyl carbonate; and an aliphatic carbonate compound such as dimethyl carbonate, diethyl carbonate, diisopropyl carbonate, dibutyl carbonate, diamyl carbonate, and dioctyl carbonate.

In addition, the molecular structure of the polymer chain of the polycarbonate (X) may have a branched structure, in addition to a linear structure. As a branching agent for introducing the branched structure, 1,1,1-tris(4-hydroxyphenyl)ethane, α,α',α"-tris(4-hydroxyphenyl)-1,3,5-triisopropylbenzen, phloroglucin, trimellitic acid, and isatinbis(o-cresol) can be used. In addition, as a molecular weight modifier, phenol, p-t-butylphenol, p-t-octylphenol, and p-cumylphenol can be used.

Further, the polycarbonate (X) used in the present invention may be a copolymer having a polycarbonate structural unit and a polyorganosiloxane structural unit or a resin composition composed of a homopolymer and copolymer, in addition to the homopolymer manufactured by using only the aforementioned divalent phenol. Also, the polycarbonate (X) may be polyester-polycarbonate obtained by a polymerization reaction of polycarbonate in the presence of ester precursors such as a bifunctional carboxylic acid, for example, terephthalic acid or ester forming derivatives thereof.

Further, it is possible to use a resin composition obtained by melting and kneading the polycarbonate (X) having a variety of structural units. In addition, substantially, the polycarbonate (X) does not preferably contain a halogen atom in its structural unit.

The weight average molecular weight (Mw) of the polycarbonate (X) is preferably in a range of 10,000 to 200,000. If the weight average molecular weight (Mw) is 10,000 or more, heat resistance and shock resistance of the obtained polycarbonate resin composition are enhanced, and if the weight average molecular weight (Mw) is 200,000 or less, molding workability of the obtained polycarbonate resin composition becomes more satisfactory. Also, in order to further enhance the heat resistance, shock resistance, and molding workability, the weight average molecular weight (Mw) of the polycarbonate is more preferably in a range of 10,000 to 100,000 and still more preferably in a range of 12,000 to 50,000. Also, dispersivity (weight average molecular weight (Mw)/number average molecular weight (Mn)) of the polycarbonate (X) is preferably in a range of 1 to 2.5, more preferably in a range of 1.2 to 2, and still more preferably in a range of 1.4 to 1.8.

Here, in the present invention, the weight average molecular weight (Mw) and the number average molecular weight (Mn) are values calculated in terms of polystyrene based on a GPC measurement. In addition, GPC measurement conditions are as follows.

[GPC measurement conditions]

Measuring apparatus: "HLC-8220 GPC" manufactured by Tosoh Corporation

Column: Guard Column "HHR-H" (6.0 mm I.D.×4 cm) manufactured by Tosoh Corporation+"TSK-GEL GMHHR-N" (7.8 mm I.D.×30 cm) manufactured by Tosoh Corporation+"TSK-GEL GMHHR-N" (7.8 mm I.D.×30 cm) manufactured by Tosoh Corporation+"TSK-GEL GMHHR-N" (7.8 mm I.D.×30 cm) manufactured by Tosoh Corporation+"TSK-GEL GMHHR-N" (7.8 mm I.D.×30 cm) manufactured by Tosoh Corporation Detector: ELSD ("ELSD2000" manufactured by Alltech, Inc. Japan)

Data Processing: "GPC-8020 model II data analysis version 4.30" manufactured by Tosoh Corporation Measurement conditions: Column temperature 40° C.

Developing solvent tetrahydrofuran (THF)

Flow rate 1.0 ml/min

Sample: a solution (5 μl) obtained by filtering a tetrahydrofuran solution of 1.0% by mass in terms of resin solid content through a microfilter.

Standard sample: according to the measurement manual of the "GPC-8020 model II data analysis Version 4.30", the following monodisperse polystyrene of which the molecular weight is known was used.

(Monodisperse Polystyrene)

"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation "F-128" manufactured by Tosoh Corporation
"F-288" manufactured by Tosoh Corporation
"F-550" manufactured by Tosoh Corporation The polyester resin (Y) used in the present invention is represented by General Formula (1) shown below:

$$B\text{-}(G\text{-}A)_n\text{-}G\text{-}B \quad (1)$$

(in the formula, B represents an aryl monocarboxylic acid residue having 6 to 12 carbon atoms or an aliphatic monocarboxylic acid residue having 1 to 8 carbon atoms. G represents an alkylene glycol residue having 2 to 12 carbon atoms or an oxyalkylene glycol residue having 4 to 12 carbon atoms. A represents an alkylene dicarboxylic acid residue having 2 to 12 carbon atoms or an aryl dicarboxylic acid residue having 6 to 12 carbon atoms. n is an integer of 0 to 9), and has a number average molecular weight of 200 to 2,000. The present inventors consider that the polyester resin (Y) having the structure is successfully incorporated into a free volume moiety of the polycarbonate resin (X), which is a base polymer, thereby suppressing a movement of main chain of the base polymer and consequently suppressing variation due to stress.

As described above, it is necessary that the polyester resin (Y) used in the present invention has the number average molecular weight (Mn) of 200 to 2,000. If the (Mn) is smaller than 200, the resin volatilizes and as a result, it is difficult to obtain the optical member which exhibits little change in birefringence due to external force, which is not preferable. In addition, if the (Mn) is greater than 2,000, compatibility with the polycarbonate resin is deteriorated, and as a result, a molded product tends to have high haze, which is inappropriate as the optical member and not preferable. The (Mn) of the polyester resin (Y) used in the present invention is more preferably from 250 to 1,000.

In the case where n is 0 in General Formula (1), the polyester resin (Y) used in the present invention becomes diester, and in this case, the resin has a structure represented by "B-G-B".

Here, B represents an aryl monocarboxylic acid residue having 6 to 12 carbon atoms or an aliphatic monocarboxylic acid residue having 1 to 8 carbon atoms. G represents an alkylene glycol residue having 2 to 12 carbon atoms or an oxyalkylene glycol residue having 4 to 12 carbon atoms. A represents an alkylene dicarboxylic acid residue having 2 to 12 carbon atoms or an aryl dicarboxylic acid residue having 6 to 12 carbon atoms. In the present invention, B, G, and A existing in a plurality of numbers in General Formula (1) respectively may be the same as or different from each other.

In General Formula (1), a polyester resin, in which in the case where n is an integer of 1 to 9, B represents a benzene monocarboxylic acid residue, G represents an alkylene glycol residue having 2 to 6 carbon atoms, and A represents an alkylene dicarboxylic acid residue having 2 to 6 carbon atoms or an aryl dicarboxylic acid residue having 6 to 12 carbon atoms, is preferable, since the resin is easily synthesized, and further a molded article having a low photoelastic coefficient is obtained. In addition, in General Formula (1), a polyester resin (diester), in which in the case where n is 0, B represents a benzene monocarboxylic acid residue or an alicyclic monocarboxylic acid residue having 6 to 8 carbon atoms, and G represents an alkylene glycol residue having 2 to 6 carbon atoms, is preferable, since the resin is easily synthesized, and further a molded article having a low photoelastic coefficient is obtained.

In the present invention, in General Formula (1), a polyester resin in which n is an integer of 1 to 9 may be referred to as a "polyester resin represented by General Formula (1-1)". In addition, a polyester resin in which n is 0 may be referred to as a "polyester resin represented by General Formula (1-2)".

Among the polyester resins represented by General Formula (1-1), a polyester resin, in which B represents a benzoic acid residue, G represents a propylene glycol residue, and A represents a phthalic acid residue, a cyclohexane dicarboxylic acid residue, or an adipic acid residue, is preferable, since an optical member which exhibits little change in birefringence due to external force is easily obtained.

Among the polyester resins represented by General Formula (1-2), a polyester resin, in which B represents a benzoic acid residue, a paratoluic acid residue, or a cyclohexane carboxylic acid residue, and G represents a propylene glycol residue, a neopentyl glycol residue, a butanediol residue, or a hexanediol residue, is preferable, since an optical member which exhibits little change in birefringence due to external force is easily obtained.

The polyester resin represented by General Formula (1-1) can be obtained, for example, by the following methods.

Method 1: a method in which monocarboxylic acid constituting respective residues of General Formula (1-1), dicarboxylic acid, and glycol are prepared all together to cause them to react to each other.

Method 2: a method in which dicarboxylic acid constituting residues of General Formula (1-1) and glycol are reacted to each other under the condition of the equivalent of a hydroxyl group being greater than the equivalent of a carboxyl group to obtain a polyester resin having a hydroxyl group at the terminal of a main chain, and then to cause the polyester resin and monocarboxylic acid constituting B or a monocarboxylic acid derivative to react to each other.

In addition, the polyester resin represented by General Formula (1-2) can be obtained, for example, by the following methods.

Method 1: a method in which monocarboxylic acid constituting respective residues of General Formula (1-2) and glycol are prepared to cause them to react to each other.

Examples of the aryl monocarboxylic acid having 6 to 12 carbon atoms, which is a raw material constituting B, include benzoic acid, dimethyl benzoic acid, trimethyl benzoic acid, tetramethyl benzoic acid, ethyl benzoic acid, propyl benzoic acid, butyl benzoic acid, cuminic acid, para tertiary butyl benzoic acid, orthotoluic acid, metatoluic acid, paratoluic acid, ethoxy benzoic acid, propoxy benzoic acid, naphthoic acid, nicotinic acid, furoic acid, and anisic acid; and methylesters and acid chlorides thereof. These may be used alone or two or more thereof may be used in combination.

In addition, examples of the aliphatic monocarboxylic acid having 1 to 8 carbon atoms, which is a raw material constituting B, include acetic acid, propionic acid, butanoic acid, hexanoic acid, octanoic acid, octylic acid, and cyclohexane carboxylic acid. These may be used alone or two or more thereof may be used in combination.

In the case where the polyester resin (Y) used in the present invention is the polyester resin represented by General Formula (1-1), the raw material constituting B is preferably benzoic acid. In addition, in the case where the polyester resin (Y) used in the present invention is the polyester resin represented by General Formula (1-2), the raw material constituting B is preferably at least one acid selected from the group consisting of benzoic acid, paratoluic acid, and cyclohexane carboxylic acid, since it is easy to obtain an optical member which exhibits little change in birefringence due to external force. In addition, in the present invention "the number of carbon atoms" refers to the number of carbon atoms not including carbonyl carbon.

Examples of the alkylene glycol having 2 to 12 carbon atoms, which is a raw material constituting G, include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol(neopentyl glycol), 2,2-diethyl-1,3-propanediol(3,3-dimethylolpentane), 2-n-butyl-2-ethyl-1,3-propanediol(3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-dodecanediol. These may be used alone or two or more thereof may be used in combination.

Examples of the oxyalkylene glycol having 4 to 12 carbon atoms, which is a raw material constituting G include diethylene glycol, triethylene glycol, tetraethylene glycol, dipropylene glycol, and tripropylene glycol. These may be used alone or two or more thereof may be used in combination.

In the case where the polyester resin (Y) used in the present invention is the polyester resin represented by General Formula (1-1), propylene glycol is preferable as the raw material constituting G, since it is easy to obtain an optical member which exhibits little change in birefringence due to external force. In addition, in the case where the polyester resin (Y) used in the present invention is the polyester resin represented by General Formula (1-2), at least one glycol selected from the group consisting of propylene glycol, neopentyl glycol, butanediol, and hexanediol is preferable as the raw material constituting G, since it is easy to obtain an optical member which exhibits little change in birefringence due to external force.

Examples of the alkylene dicarboxylic acid having 2 to 12 carbon atoms, which is a raw material constituting A, include succinic acid, maleic acid, fumaric acid, glutaric acid, adipic acid, azelaic acid, sebacic acid, dodecane dicarboxylic acid, and cyclohexane dicarboxylic acid.

Examples of the aryl dicarboxylic acid, which is a raw material constituting A include phthalic acid, terephthalic acid, isophthalic acid, dimethyl terephthalate, 2,6-naphthalenedicarboxylic acid, 1,5-naphthalenedicarboxylic acid, 1,4-naphthalenedicarboxylic acid, dimethyl 2,6-naphthalenedicarboxylate, dimethyl 1,5-naphthalenedicarboxylate, and dimethyl 1,4-naphthalenedicarboxylate. These may be used alone or two or more thereof may be used in combination.

In the case where the polyester resin (Y) used in the present invention is the polyester resin represented by General Formula (1-1), at least one dicarboxylic acid selected from the group consisting of phthalic acid, cyclohexane dicarboxylic acid and adipic acid is preferable as the raw material constituting A, since it is easy to obtain an optical member which exhibits little change in birefringence due to external force.

The acid value of the polyester resin (Y) used in the present invention is preferably 5 or less and more preferably 1 or less, since it is possible to obtain a molded article having sufficient strength without causing the polycarbonate resin (X) to decompose. In addition, the hydroxyl value of the polyester resin (Y) is preferably 50 or less and more preferably 20 or less, since it is possible to obtain a resin composition for an optical material having excellent stability against heat or the like at the time of forming a film.

The polyester resin (Y) used in the present invention can be manufactured by esterifying the raw material, for example, in the presence of an esterification catalyst as necessary, for example, within a temperature range of 180 to 250° C. for 10 to 25 hours. In addition, the conditions such as the temperature and the time for esterification are not limited thereto, and may be appropriately set.

Examples of the esterification catalyst include a titanium-based catalyst such as tetraisopropyl titanate and tetrabutyl titanate; a tin-based catalyst such as dibutyl tin oxide; and an organic sulfonic acid-based catalyst such as p-toluene sulfonic acid.

The use amount of the esterification catalyst may be appropriately set, but in general, it is preferable to use the esterification catalyst in a range of 0.001 to 0.1 parts by mass with respect to the total 100 parts by mass of the raw material.

The physical properties of the polyester resin (Y) used in the present invention vary depending on factors such as a number average molecular weight and a composition, but in general, the resin is a liquid, solid, or a paste form at room temperature.

The content of the polyester resin (Y) in the resin composition for an optical material of the present invention depends on the photoelastic coefficient of the polycarbonate resin (X) to be used, but the content is preferably 0.5 to 10 parts by mass and more preferably 2 to 8 parts by mass with respect to 100 parts by mass of the polycarbonate resin (X), since it is possible to reduce the absolute value of the photoelastic coefficient of the resin composition.

The optical film of the present invention is characterized in that the film contains the resin composition for an optical material of the present invention. The optical film of the present invention is characterized in that the photoelastic coefficient is low, and specifically, the absolute value of the photoelastic coefficient is preferably $70 \times 10^{-12}$/Pa or less and more preferably $65 \times 10^{-12}$/Pa or less. In this way, the optical film of the present invention has low photoelastic coefficient and as a result, exhibits little change in birefringence due to external force, and it is possible to provide a liquid crystal display device whose image visibility hardly changes due to external force.

In the present invention, the photoelastic coefficient of the optical film of the present invention was measured by the following method.

<Method for Measuring a Photoelastic Coefficient ($C_R$)>

The optical film of the present invention is cut out in a width of 15 mm such that a transportation direction becomes longitudinal to obtain a measurement sample. This measurement sample is fixed to a tensile jig for measuring photoelasticity (manufactured by Oji Scientific Instruments), the weighting is changed when pulling the measurement sample every 100 g·f from 127.3 g·f to 727.3 g·f, and change of an in-plane phase difference of 588 nm is measured by a phase difference measuring apparatus KOBRA-WR (manufactured by Oji Scientific Instruments) every time the each weighting is applied. The measurement is performed under an atmosphere in which temperature is 23° C. and relative humidity is 55%.

It is possible to manufacture various optical molded bodies by using the composition for an optical material of the present invention. Among these, the composition for an optical material of the present invention can be preferably used in manufacturing a film-shaped molded body (an optical film). Among the optical films of the present invention, for example, the stretched optical film in which the absolute value of the photoelastic coefficient is $70(\times 10^{-12}$/Pa) or less can be appropriately used for the purpose which requires a phase difference such as a phase difference film and properties of little change in birefringence due to a stress. As the phase difference film, an optical film in which the absolute value of the photoelastic coefficient is $65(\times 10^{-12}/Pa)$ or less, is preferable, and an optical film in which the absolute value of the photoelastic coefficient is $60(\times 10^{-12}/Pa)$ or less, is more preferable. The stretching ratio of the optical film can be appropriately selected depending on the purpose and it is possible to obtain both optically isotropic optical film having low birefringence and a phase difference film having great birefringence by adjusting the amount of the polyester-based resin (Y).

Other resins can be contained in the resin composition for an optical material of the present invention within a range not impairing the purpose of the present invention, in addition to the polycarbonate resin (X) and the polyester resin (Y). Examples of the resin other than the polymer (X) and the polyester resin (Y) include polyolefins such as polyethylene and polypropylene; a styrene-based resin such as polystyrene and a styrene acrylonitrile copolymer; a thermoplastic resin such as polyester, polysulfone, polyphenylene oxide, polyimide, polyetherimide, and polyacetal other than polyamide, polyphenylene sulfide resin, polyetheretherketone resin, and the polyester resin (Y); and a thermosetting resin such as a phenol resin, a melamine resin, a silicone resin, and an epoxy resin. These may be used alone or two or more thereof may be used in combination.

Further, optional additives can be blended depending on various purposes within a range not remarkably impairing the effect of the present invention. The type of the additives is not particularly limited, if the additives are generally used for blending with a resin or a rubber-shaped polymer. Examples of the additives include a pigment such as an inorganic filler and iron oxide; a lubricant such as stearic acid, behenic acid, zinc stearate, calcium stearate, magnesium stearate, and ethylenebisstearoamide; a mold releasing agent; a softener-plasticizer such as paraffin-based process oil, a naphthene-based process oil, aromatic process oil, paraffin, organic polysiloxane, and mineral oil; an antioxidant such as a hindered phenol-based antioxidant, a phosphorus-based heat stabilizer, a lactone-based heat stabilizer, and a vitamin E-based heat stabilizer; a photostabilizer such as a hindered amine-based photostabilizer and a benzoate-based photostabilizer; an ultraviolet absorbing agent such as a benzophenone-based ultraviolet absorbing agent, a triazine-based ultraviolet absorbing agent, and a benzotriazole-based ultraviolet absorbing agent; a flame retardant; an anti-static agent; a reinforcing agent such as an organic fiber, a glass fiber, a carbon fiber, and a metal whisker; a coloring agent; and other additives or mixtures thereof.

The resin composition for an optical material of the present invention may contain the polycarbonate resin (X) and the polyester resin (Y), and a manufacturing method thereof is not particularly limited. Specifically, for example, the resin composition for an optical material of the present invention can be obtained by a method for melting and kneading the polycarbonate resin (X), the polyester resin (Y) and the aforementioned additives, as necessary, using a melting and kneading apparatus such as a single screw extruder, a twin screw extruder, a banbury mixer, a brabender, and various kneaders.

The optical film of the present invention is characterized in that the film contains the resin composition for an optical material of the present invention. In order to obtain the optical film of the present invention, for example, means such as extrusion molding and cast molding can be used. Specifically, for example, an unstretched optical film can be extrusion-molded by using extruders mounted with a T die, a circular die, or the like. In the case where the optical film of the present invention is obtained by extrusion molding, it is possible to use the resin composition for an optical material of the present invention obtained by melting and kneading the polycarbonate resin (X) and the polyester resin (Y) in advance, or it is also possible to perform extrusion molding by melting and kneading the polycarbonate resin (X) and the polyester resin (Y) at the time of extrusion molding. Also, it is possible to obtain the unstretched optical film of the present invention by a solvent cast method using a solvent which dissolves the polycarbonate resin (X) and the polyester resin (Y) components, in which cast molding is performed after the polycarbonate resin (X) and the polyester resin (Y) are dissolved in the solvent, so-called a dope solution is obtained.

Hereinafter, the solvent cast method will be described. The optical film obtained by the solvent cast method substantially is optically isotropic. The optically isotropic film can be used for, for example, an optical material such as a liquid crystal display, and among these, is useful for a protective film for a polarizing plate. Also, in the film obtained by the method, irregularities are hardly formed on the surface thereof, and smoothness of the surface is excellent.

In general, the solvent cast method includes a first step of dissolving the polycarbonate resin (X) and the polyester resin (Y) in an organic solvent to flow-cast the obtained resin solution on a metal support; a second step of removing the organic solvent included in the flow-casted resin solution by distillation and drying to form a film; and subsequently a third step of peeling off the film formed on the metal support to dry with heat.

Examples of the metal support used in the first step include an endless belt-shaped or a drum-shaped support made of metals, and for example, a support of which the surface is mirror-finished and which is made of a stainless steel can be used.

When the resin solution is flow-casted on the metal support, it is preferable to use a resin solution filtrated by a filter, in order to prevent a foreign matter from being incorporated into the obtained film.

The drying method of the second step is not particularly limited, and a method can be exemplified, in which a wind within a temperature range of for example, 30 to 50° C. is applied to an upper surface and/or lower surface of the metal support to evaporate 50 to 80% by mass of the organic solvent included in the flow-casted resin solution, thereby forming a film on the metal support.

Next, the third step is a step in which the film formed in the second step is peeled off from the metal support and dried with heat under the temperature condition higher than the second step. As the drying method with heat, a method for gradually increasing the temperature under the temperature condition of for example, 100 to 160° C. is preferable because satisfactory dimension stability can be obtained. By drying the film with heat under the aforementioned temperature condition, it is possible to almost completely remove the organic solvent remaining in the film after the second step.

In addition, the organic solvent can be recovered and reused in the first step to the third step.

The organic solvent which can be used when mixing and dissolving the polycarbonate resin (X) and the polyester resin (Y) in the organic solvent is not particularly limited, if the solvent can dissolve these resins, and for example, solvents such as chloroform, methylene dichloride, and methylene chloride can be exemplified.

The concentration of the polycarbonate resin (X) in the resin solution is preferably 10 to 50% by mass and more preferably 15 to 35% by mass.

The film thickness of the optical film of the present invention is preferably in a range of 20 to 120 µm, more preferably in a range of 25 to 100 µm, and particularly preferably in a range of 25 to 80 µm.

In the present invention, it is possible to obtain a stretched optical film by for example, longitudinally uniaxially stretching an unstretched optical film obtained by the method in a mechanical flowing direction or transversely uniaxially stretching the film in a direction straight to the mechanical flowing direction, as necessary. In addition, it is possible to obtain a biaxially stretched film by stretching according to a successive biaxial stretching method including roll stretching and tender stretching, a simultaneous biaxial stretching method including tender stretching, and a biaxial stretching method including tubular stretching. The stretching ratio is preferably 0.1% to 1,000% in at least either direction, more preferably 0.2% to 600%, and particularly preferably 0.3% to 300%. By setting the stretching ratio within the range, it is possible to obtain a preferable stretched optical film from a viewpoint of birefringence, heat resistance, and strength.

The optical film of the present invention can be preferably used, as an optical material, for a polarizing plate protective film used for a display such as a liquid crystal display device, a plasma display, an organic EL display, afield emission display, and a rearprojection television, a quarter wave plate, a half wave plate, a viewing angle control film, and a phase difference film, for example, a liquid crystal optical compensation film, and a display front surface plate. In addition to the above, the resin composition for an optical material of the present invention can be also used for a waveguide, a lens, an optical fiber, a base material of the optical fiber, a coating material, an LED lens, and a lens cover in the field of an optical communication system, a photonic switching system, and an optical measurement system.

EXAMPLES

Hereinafter, the present invention will be further specifically described based on Examples. Parts and % are based on mass unless otherwise mentioned.

Synthesis Example 1

Preparation of a Polyester Resin (Y)

After 132 g of adipic acid (hereinafter, abbreviated as "AA"), 400 g of phthalic anhydride (hereinafter, abbreviated as "PA"), 977 g of benzoic acid (hereinafter, abbreviated as "BzA"), 648 g of propylene glycol (hereinafter, abbreviated as "PG"), and 0.130 g of tetra isopropoxy titanium (hereinafter, abbreviated as "TiPT") were put into a four neck flask having an inner capacity of 3 L equipped with a thermometer, a stirrer, a nitrogen introducing tube and a side arm type distilling column, a reaction was performed for 20 hours. After the reaction, unreacted 1,2-propylene glycol was removed by distillation at a temperature of 200° C. under reduced pressure. After that, the reduced pressure was released and the temperature was decreased, a reaction product was taken out by filtering, thereby obtaining a polyester resin (Y1). The number average molecular weight (Mn) of the polyester resin (Y1) was 430, the weight average molecular weight (Mw) thereof was 550, the acid value thereof was 0.1, and the hydroxyl value thereof was 8.0.

Synthesis Example 2

Same as the Above

Polyester resin (Y2) was obtained in the same manner as in Synthesis Example 1 except that 130 g of PA, 50 g of 1,4-cyclohexane dicarboxylic acid (hereinafter, abbreviate as "CHDA"), 317 g of BzA, 210 g of PG, and 0.021 g of TiPT were used. The number average molecular weight (Mn) of the polyester resin (Y2) was 430, the weight average molecular weight (Mw) thereof was 540, the acid value thereof was 0.4, and the hydroxyl value thereof was 15.

Synthesis Example 3

Same as the Above

Polyester resin (Y3) was obtained in the same manner as in Synthesis Example 1 except that 533 g of PA, 977 g of BzA, 648 g of PG, and 0.130 g of TiPT were used. The number average molecular weight (Mn) of the polyester resin (Y3) was 430, the weight average molecular weight (Mw) thereof was 520, the acid value thereof was 0.3, and the hydroxyl value thereof was 11.

Synthesis Example 4

Same as the Above

Polyester resin (Y4) was obtained in the same manner as in Synthesis Example 1 except that 263 g of AA, 266 g of PA, 977 g of BzA, 648 g of PG, and 0.130 g of TiPT were used. The number average molecular weight (Mn) of the polyester resin (Y4) was 430, the weight average molecular weight (Mw) thereof was 550, the acid value thereof was 0.40, and the hydroxyl value was.

Synthesis Example 5

Same as the Above

Polyester resin (Y5) was obtained in the same manner as in Synthesis Example 1 except that 394 g of AA, 133 g of PA, 977 g of BzA, 648 g of PG, and 0.130 g of TiPT were used. The number average molecular weight (Mn) of the polyester resin (Y5) was 480, the weight average molecular weight (Mw) thereof was 710, the acid value thereof was 0.2, and the hydroxyl value thereof was 6.

Synthesis Example 6

Same as the Above

Polyester resin (Y6) was obtained in the same manner as in Synthesis Example 1 except that 526 g of AA, 977 g of BzA, 648 g of PG, and 0.130 g of TiPT were used. The number average molecular weight (Mn) of the polyester resin (Y6) was 450, the weight average molecular weight (Mw) thereof was 570, the acid value thereof was 0.2, and the hydroxyl value thereof was 10.

Preparation Example 1

Preparation of Polyester Resin (B) Having Number Average Molecular Weight Adjusted A thin film distillation of the polyester resin (B1) was performed using a thin film distillation apparatus, and a polyester resin (Y7) in which a component having a high molecular weight is fractionated, and a polyester resin (Y8) in which a component having a low molecular weight is fractionated were obtained. The number average molecular weight (Mn) of the polyester resin (Y7) was 570, the weight average molecular weight (Mw) thereof was 690, the acid value thereof was 0.4, and the hydroxyl value thereof was 8. The number average molecular weight (Mn) of the polyester resin (Y8) was 280, the weight average molecular weight (Mw) thereof was 280, the acid value thereof was 0.2, and the hydroxyl value thereof was 14.

Table 1 shows raw materials of the polyester resins (Y1) to (Y8) and physical properties.

TABLE 1

| | | Synthesis Example 1 | Synthesis Example 2 | Synthesis Example 3 | Synthesis Example 4 | Synthesis Example 5 | Synthesis Example 6 | Preparation Example 1 | |
|---|---|---|---|---|---|---|---|---|---|
| Polyester resin | | (Y1) | (Y2) | (Y3) | (Y4) | (Y5) | (Y6) | (Y7) | (Y8) |
| Raw material | Glycol | | | | | PG | | | |
| | Dibasic acid (*) | AA(25) PA(75) | CHDA(25) PA(75) | PA(100) | AA(50) PA(50) | AA(75) PA(25) | AA(100) | AA(25) PA(75) | AA(25) PA(75) |
| | Monobasic acid | BzA | BzA | BzA | BzA | BzA | BzA | BzA | BzA |
| Appearance (Visually observed) | | Transparent yellow liquid | Transparent yellow liquid | Transparent yellow liquid | Transparent yellow liquid | Transparent yellow liquid | Transparent yellow liquid | Transparent yellow liquid | Transparent liquid |
| Acid value | | 0.1 | 0.4 | 0.3 | 0.4 | 0.4 | 0.2 | 0.4 | 0.2 |
| Hydroxyl value | | 8 | 15 | 11 | 3 | 2 | 10 | 8 | 14 |
| GPC | Mn | 430 | 430 | 430 | 430 | 480 | 450 | 570 | 280 |
| | Mw | 550 | 540 | 520 | 550 | 710 | 570 | 690 | 280 |
| | Mw/Mn | 1.3 | 1.3 | 1.2 | 1.3 | 1.5 | 1.3 | 1.2 | 1.0 |

(*): A content within the parenthesis refers to a ratio based on a mass
Footnote of Table 1
(*): A content within the parenthesis refers to a ratio based on a mass.
PG: 1,2-propylene glycol
AA: adipic acid
PA: phthalic anhydride
CHDA: 1,4-cyclohexanedicarboxylic acid
BzA: benzoic acid Synthesis Example 7

Same as the Above

After 358 g of PG, 1000 g of BzA, and 0.081 g of TiPT were put into a four neck flask having an inner capacity of 3 L equipped with a thermometer, a stirrer, a nitrogen introducing tube and a side arm type distilling column, a reaction was performed for 13 hours. After the reaction, unreacted 1,2-propylene glycol was removed by distillation at a temperature of 190° C. under reduced pressure. After that, the reduced pressure was released and the temperature was decreased, a reaction product was taken out by filtering, thereby obtaining a polyester resin (Y9). The number average molecular weight (Mn) of the polyester resin (Y9) was 300, the weight average molecular weight (Mw) thereof was 300, the acid value thereof was 0.1, and the hydroxyl value thereof was 1.

Synthesis Example 8

Same as the Above

Polyester resin (Y10) was obtained in the same manner as in Synthesis Example 7 except that 358 g of 1,3-propylene glycol (hereinafter, abbreviated as "1,3-PG"), 1000 g of BzA, and 0.081 g of TiPT were used in a four neck flask having an inner capacity of 3 L equipped with a thermometer, a stirrer, a nitrogen introducing tube and a side arm type distilling column. The number average molecular weight (Mn) of the polyester resin (Y10) was 250, the weight average molecular weight (Mw) thereof was 260, the acid value thereof was 0.1, and the hydroxyl value thereof was 1.

Synthesis Example 9

Polyester resin (Y11) was obtained in the same manner as in Synthesis Example 7 except that a four neck flask having an inner capacity of 2 L was used, and 437 g of neopentyl glycol (hereinafter, abbreviated as "NPG"), 733 g of BzA, and 0.070 g of TiPT were used. The number average molecular weight (Mn) of the polyester resin (Y11) was 320, the weight average molecular weight (Mw) thereof was 320, the acid value thereof was 0.1, and the hydroxyl value thereof was 18.

Synthesis Example 10

Polyester resin (Y12) was obtained in the same manner as in Synthesis Example 7 except that 849 g of 1,4-butanediol (hereinafter, abbreviated as "1,4-BG"), 1000 g of BzA, and 0.111 g of TiPT were used. The number average molecular weight (Mn) of the polyester resin (Y12) was 270, the weight average molecular weight (Mw) thereof was 280, the acid value thereof was 0.1, and the hydroxyl value thereof was 10.

Synthesis Example 11

Same as the Above

Polyester resin (Y13) was obtained in the same manner as in Synthesis Example 7 except that a four neck flask having an inner capacity of 2 L was used, and 334 g of 1,6-hexanediol (hereinafter, abbreviated as "1,6-HD"), 600 g of BzA, and 0.056 g of TiPT were used. The number average molecular weight (Mn) of the polyester resin (Y13) was 300, the weight average molecular weight (Mw) thereof was 310, the acid value thereof was 0.1, and the hydroxyl value thereof was 10.

Synthesis Example 12

Same as the Above

Polyester resin (Y14) was obtained in the same manner as in Synthesis Example 7 except that 664 g of 1,4-cyclohexanedimethanol (hereinafter, abbreviated as "CHDM"), 977 g of BzA, and 0.098 g of TiPT were used. The number average molecular weight (Mn) of the polyester resin (Y14) was 300, the weight average molecular weight (Mw) thereof was 310, the acid value thereof was 0.1, and the hydroxyl value thereof was 41.

Synthesis Example 13

Same as the Above

Polyester resin (Y15) was obtained in the same manner as in Synthesis Example 7 except that 321 g of PG, 1000 g of p-toluic acid (hereinafter, abbreviated as "pTA"), and 0.079 g of TiPT were used. The number average molecular weight (Mn) of the polyester resin (Y15) was 300, the weight average molecular weight (Mw) thereof was 300, the acid value thereof was 0.1, and the hydroxyl value thereof was 0.2.

Synthesis Example 14

Polyester resin (Y16) was obtained in the same manner as in Synthesis Example 7 except that a four neck flask having an inner capacity of 2 L was used, and 437 g of NPG, 817 g of pTA, and 0.075 g of TiPT were used. The number average molecular weight (Mn) of the polyester resin (Y16) was 310, the weight average molecular weight (Mw) thereof was 320, the acid value thereof was 0.1, and the hydroxyl value thereof was 43.

Synthesis Example 15

Polyester resin (Y17) was obtained in the same manner as in Synthesis Example 7 except that a four neck flask having an inner capacity of 2 L was used, and 62 g of PG, 200 g of cyclohexane carboxylic acid (hereinafter, abbreviated as "CHCA"), and 0.016 g of TiPT were used. The number average molecular weight (Mn) of the polyester resin (Y17) was 310, the weight average molecular weight (Mw) thereof was 310, the acid value thereof was 0.2, and the hydroxyl value thereof was 9.

Table 1 shows raw materials of the polyester resins (Y9) to (Y17) and physical properties.

TABLE 2

|  |  | Synthesis Example 7 | Synthesis Example 8 | Synthesis Example 9 | Synthesis Example 10 | Synthesis Example 11 | Synthesis Example 12 | Synthesis Example 13 | Synthesis Example 14 | Synthesis Example 15 |
|---|---|---|---|---|---|---|---|---|---|---|
| Polyester resin |  | (Y9) | (Y10) | (Y11) | (Y12) | (Y13) | (Y14) | (Y15) | (Y16) | (Y17) |
| Raw material | Glycol | PG | 1,3-PG | NPG | 1,4-BG | 1,6-HD | CHDM | PG | NPG | PG |
|  | Monobasic acid |  |  |  | BzA |  |  |  | pTA | CHCA |
| Appearance (Visually observed) |  | Transparent yellow liquid | Solid in white | Solid in white | Solid in white | Solid in white | Solid in white | Transparent yellow liquid | Solid in white | Transparent yellow liquid |
| Acid value |  | 0.1 | 0.1 | 0.1 | 0.1 | 0.1 | 0.1 | 0.4 | 0.1 | 0.2 |
| Hydroxyl value |  | 1 | 1 | 18 | 10 | 10 | 41 | 8 | 43 | 9 |
| GPC | Mn | 300 | 250 | 320 | 270 | 300 | 300 | 300 | 310 | 310 |
|  | Mw | 300 | 260 | 320 | 280 | 310 | 310 | 300 | 320 | 310 |
|  | Mw/Mn | 1.0 | 1.0 | 1.0 | 1.0 | 1.0 | 1.0 | 1.0 | 1.0 | 1.0 |

Footnote of Table 2
PG: 1,2-propylene glycol
1,3-PG: 1,3-propylene glycol
NPG: neopentyl glycol
1,4-BG: 1,4-butanediol
1,6-HG: 1,6-hexanediol
CHDM: 1,4-cyclohexanedimethanol
BzA: benzoic acid
pTA: paratoluic acid
CHCA: cyclohexane carboxylic acid Example 1

Preparation of Resin Composition for an Optical Material and Optical Film 100 parts of a polycarbonate resin (AD-5503, manufactured by TEIJIN Limited.) and the polyester resin (Y1) in an amount shown in Table 3 (0 parts to 8 parts) were respectively added to 142 parts of dichloromethane and dissolved to obtain a solution. The solution was stirred in a vacuum mixer for 60 to obtain a resin composition for an optical material (dope solution) of the present invention.

The dope solution was flow-casted on a glass plate to have the film thickness of 0.3 mm, dried at a temperature of 40° C. for 10 minutes in a drying machine, and further dried at a temperature of 80° C. for 10 minutes to obtain a film having a width of 180 mm, a length of 250 mm and a film thickness of 50 μm.

The photoelastic coefficient ($C_R$) was measured using the obtained film, and the result is shown in Table 3. Also, the measurement method of the photoelastic coefficient ($C_R$) is shown below.

<Measurement Method of Photoelastic Coefficient ($C_R$)>

The film was cut to have a width of 15 mm and a length of 80 mm such that a flow-cast direction of the film becomes a longitudinal direction to prepare a film test piece. The film test piece was fixed to a tensile jig for measuring photoelasticity (manufactured by Oji Scientific Instruments), a change of an in-plane phase difference (Re) at 588 nm was measured by a phase difference measuring apparatus KOBRA-WR (manufactured by Oji Scientific Instruments) when the weighting was changed every 100 g·f from 127.3 g·f to 727.3 g·f. The measurement was performed under an atmosphere in which the temperature is 23° C. and the relative humidity is 55%. The in-plane phase difference (Re) was obtained according to the following equation.

$$Re = (n_x - n_y) \times d$$

[($n_x$): Refractive index in a stretching direction, ($n_y$): Refractive index in a direction perpendicular to the stretching direction, d: Thickness of film (μm)]

A stress (σ) was plotted in a horizontal axis and an in-plane phase difference (Re) was plotted in a vertical axis using the measured values, and the photoelastic coefficient ($C_R$) was obtained from straight line inclination in a linear area using least square approximation. As the absolute value of the inclination is smaller, the photoelastic coefficient approximates to 0, which indicates a film which exhibits little change in birefringence due to external force.

Examples 2 to 20

Same as the Above

The same as in Example 1 was performed except that the resin composition for an optical material (dope solution) was obtained according to the blending ratio shown in Tables 3 and 4, thereby obtaining a film. Evaluation was performed in the same manner as in Example 1, and the results of the photoelastic coefficient ($C_R$) were respectively shown in Tables 3 and 4.

TABLE 3

| | | | | | Examples | | | | | | |
|---|---|---|---|---|---|---|---|---|---|---|---|
| | 1 | 2 | 3 | 4 | 5 | 6 | 7 | 8 | 9 | 10 | 11 |
| Used polyester (B) | (Y1) | (Y2) | (Y3) | (Y4) | (Y5) | (Y6) | (Y7) | (Y7)/(Y8) = 2/1 | (Y7)/(Y8) = 1.5/1.5 | (Y7)/(Y8) = 1/2 | (Y8) |
| Added amount (parts) with respect to 100 parts by mass of polycarbonate resin | | | | | | | | | | | |
| 0 | | | | | | | | 88 | | | |
| 0.5 | — | — | — | — | — | — | — | — | — | — | 77 |
| 1 | — | — | — | — | — | — | — | — | — | — | 73 |
| 2 | 77 | 74 | 73 | 76 | 71 | 75 | 80 | 76 | 74 | 69 | 68 |
| 4 | 69 | 68 | 69 | 67 | 69 | 67 | 71 | 70 | 66 | 67 | 64 |
| 6 | 65 | 63 | 70 | 64 | 65 | 62 | 68 | 67 | 68 | 71 | 71 |
| 8 | 66 | 64 | — | — | — | — | — | — | — | — | — |

Footnote of Table 3
—: Unmeasured.
Unit of photoelastic coefficient: $\times 10^{-12}$/Pa

TABLE 4

| | Examples | | | | | | | | |
|---|---|---|---|---|---|---|---|---|---|
| | 12 | 13 | 14 | 15 | 16 | 17 | 18 | 19 | 20 |
| Used polyester (B) Added amount (parts) with respect to 100 parts by mass of polycarbonate resin | (Y9) | (Y10) | (Y11) | (Y12) | (Y13) | (Y14) | (Y15) | (Y16) | (Y17) |
| 0 | | | | | 88 | | | | |
| 0.5 | 77 | — | — | — | — | — | — | — | — |
| 1 | 73 | — | — | — | — | — | — | — | — |
| 2 | 68 | 75 | 71 | 79 | 78 | 73 | 67 | 66 | 73 |
| 4 | 64 | 68 | 61 | 73 | 76 | 70 | 68 | 66 | 67 |
| 5 | — | 69 | 69 | 69 | 72 | 71 | 65 | 73 | 69 |
| 6 | 71 | 70 | 73 | 66 | 70 | 68 | 68 | 71 | 70 |

Footnote of Table 4
—: Unmeasured.
Unit of photoelastic coefficient: $\times 10^{-12}$/Pa The optical film obtained by using the resin composition for optical use of the present invention is a film which has low photoelastic coefficient and exhibits little change in birefringence due to external force. Meanwhile, the optical film to which the polyester resin (Y) used in the present invention is not added has high absolute value of the photoelastic coefficient and exhibits great change in birefringence due to external force.

Example 21

Same as the Above

A film of 60 mm square (film thickness of 50 μm) was cut from the film having a width of 180 mm, a length of 250 mm and a film thickness of 50 μm obtained in Example 1. The film was stretched according to a free uniaxial stretching method using a biaxial stretching machine (manufactured by Imoto Machinery Co., Ltd.) to obtain a stretched film. The conditions at the time of stretching are as follows.

Stretching temperature: Glass transition temperature (Tg) of the resin composition for an optical material+15° C.
Stretching rate: 60 mm/min
Stretching ratio: 2.0 times In addition, a differential scanning calorimetry was performed using a Diamond DSC manufactured by Perkin Elmer Co., Ltd., and the Tg was calculated from the obtained baseline shift, which was caused by phase transition.

A film test piece was prepared by cutting the piece from the stretched film to have a width of 15 mm and a length of 80 mm such that the stretching direction of the film becomes a longitudinal direction. The same as in Example 1 was performed except that the film test piece was used and the photoelastic coefficient ($C_R$) of the stretched film was measured. The result thereof is shown in Table 5. Also, with respect to each of the resin compositions for an optical material in which the added amount of the polyester (Y) was variously changed, the glass transition temperature (Tg) is shown in Table 6 as a Reference Example.

Examples 22 to 25

Same as the Above

The same as in Example 21 was performed except that the resin composition for an optical material was used according to the blending ratio shown in Table 5, thereby obtaining a stretched film. The evaluation was performed in the same manner as in Example 1 and the results of the photoelastic coefficient ($C_R$) were shown in Table 5.

TABLE 5

|  | Examples | | | | |
| --- | --- | --- | --- | --- | --- |
|  | 21 | 22 | 23 | 24 | 25 |
| Used polyester (B) | (Y1) | (Y3) | (Y6) | (Y8) | (Y11) |
| Added amount (parts) with respect to 100 parts by mass of polycarbonate resin | | | | | |
| 0 | | | 60 | | |
| 2 | 54 | 56 | 56 | 52 | 57 |
| 4 | 41 | 52 | 48 | 46 | 54 |
| 6 | 28 | 39 | 25 | 45 | 24 |

Footnote of Table 5
Unit of photoelastic coefficient: $\times 10^{-12}/Pa$

Example 26

Same as the Above

The same as in Example 1 was performed except that the resin composition for an optical material (dope solution) was obtained according to the blending ratio shown in Table 6, thereby obtaining a film. By using the film, a water vapor permeability of the polycarbonate film was measured on the basis of JIS Z 0208. The result is shown in Table 7. In addition, the measurement conditions at the time of measuring the water vapor permeability were that temperature is 40° C. and relative humidity is 90%.

Examples 27 and 28

Same as the Above

The same as in Example 1 was performed except that the resin composition for an optical material (dope solution) was used according to the blending ratio shown in Table 6, thereby obtaining a stretched film. The evaluation was performed in the same manner as in Example 26 and the result is shown in Table 6.

TABLE 6

|  | Examples | | |
| --- | --- | --- | --- |
|  | 26 | 27 | 28 |
| Used polyester (B) | (Y3) | (Y6) | (Y9) |
| Added amount (parts) with respect to 100 parts by mass of polycarbonate resin | | | |
| 0 | | 105 | |
| 5 | 65 | 54 | 57 |

Footnote of Table 6
Unit of water vapor permeability: $g/m^2 \cdot day$

The invention claimed is:

1. A resin composition for an optical material, comprising:
a polycarbonate resin (X); and
a polyester resin (Y) whose number average molecular weight is from 200 to 2,000 and which is represented by General Formula (1) shown below:

B-(G-A)$_n$-G-B    (1)

wherein B represents an aryl monocarboxylic acid residue having 6 to 12 carbon atoms or an aliphatic monocarboxylic acid residue having 1 to 8 carbon atoms, G represents an alkylene glycol residue having 2 to 12 carbon atoms or an oxyalkylene glycol residue having 4 to 12 carbon atoms, A represents an alkylene dicarboxylic acid residue having 2 to 12 carbon atoms or an aryl dicarboxylic acid residue having 6 to 12 carbon atoms, and n is an integer of 0 to 9; and
wherein the polycarbonate resin (X) and the Polyester resin (Y) are mixed or blended together to form the resin composition.

2. The resin composition for an optical material according to claim 1,
wherein, in the polyester resin (Y), B represents a benzene monocarboxylic acid residue, G represents an alkylene glycol residue having 2 to 6 carbon atoms, A represents an alkylene dicarboxylic acid residue having 2 to 6 carbon atoms or an aryl dicarboxylic acid residue having 6 to 12 carbon atoms, and n is an integer of 1 to 9.

3. The resin composition for an optical material according to claim 2,
wherein, in General Formula (1), B represents a benzoic acid residue, G represents a propylene glycol residue, and A represents a phthalic acid residue, a cyclohexane dicarboxylic acid residue or an adipic acid residue.

4. The resin composition for an optical material according to claim 1,
wherein, in the polyester resin (Y), B represents a benzene monocarboxylic acid residue or an alicyclic monocarboxylic acid residue having 6 to 8 carbon atoms, G represents an alkylene glycol residue having 2 to 6 carbon atoms, and n is 0.

5. The resin composition for an optical material according to claim 4,
wherein, in the polyester resin (Y), B represents a benzoic acid residue, a paratoluic acid residue or a cyclohexane carboxylic acid residue, and G represents a propylene glycol residue, a neopentyl glycol residue, a butanediol residue or a hexanediol residue.

6. The resin composition for an optical material according to claim 1,
wherein the number average molecular weight of the polyester resin (Y) is from 250 to 1,000.

7. The resin composition for an optical material according to claim 1,
wherein the content of the polyester resin (Y) is from 0.5 to 10 parts by mass with respect to 100 parts by mass of the polycarbonate resin (A).

8. The resin composition for an optical material according to claim 1,
wherein the polymer (X) is an aromatic polycarbonate resin.

9. An optical film comprising the resin composition for an optical material according to claim 1.

10. The optical film according to claim 9, which is for protecting a polarizing plate.

11. A liquid crystal display device comprising the optical film according to claim 9.

12. The resin composition for an optical material according to claim 2,
wherein the polymer (X) is an aromatic polycarbonate resin.

13. The resin composition for an optical material according to claim 3,
wherein the polymer (X) is an aromatic polycarbonate resin.

14. The resin composition for an optical material according to claim 4,
wherein the polymer (X) is an aromatic polycarbonate resin.

15. The resin composition for an optical material according to claim 5,
wherein the polymer (X) is an aromatic polycarbonate resin.

16. An optical film comprising the resin composition for an optical material according to claim 2.

17. An optical film comprising the resin composition for an optical material according to claim 3.

18. An optical film comprising the resin composition for an optical material according to claim 4.

19. An optical film comprising the resin composition for an optical material according to claim 5.

20. A liquid crystal display device comprising the optical film according to claim 10.

* * * * *